Nov. 5, 1929.  C. C. HALLOWELL  1,734,253

ARTIFICIAL TOOTH

Filed March 26, 1926

Inventor
Clifton C. Hallowell,
By Clifton C. Hallowell
Attorney

Patented Nov. 5, 1929

1,734,253

UNITED STATES PATENT OFFICE

CLIFTON C. HALLOWELL, OF DREXEL HILL, PENNSYLVANIA, ASSIGNOR TO THE S. S. WHITE DENTAL MANUFACTURING COMPANY, A CORPORATION OF PENNSYLVANIA

ARTIFICIAL TOOTH

Application filed March 26, 1926. Serial No. 97,491.

My invention relates particularly to that class of artificial teeth commonly known as pontic teeth, in which the tooth-body is arranged to be supported upon its occlusally disposed end and has its root end extended to engage in the socket from which a natural tooth root has been extracted, for the purpose of preventing or arresting the absorption of the gums, and is especially directed to the form of the occlusally disposed end whereby it is guided into position and retained by its cooperation with the inner face of the cusp structure included in a bridge, or other convenient form of support.

The principal objects of my invention are to provide an artificial tooth with a convexed occlusally disposed end that may be so cooperative with a correspondingly concaved inner face of a supporting cusp structure as to effect a rocking motion of the tooth-body when moved into or out of operative position, while its root end is engaged in the gum socket.

Other objects of my invention are to provide an artificial tooth so constructed and arranged as to avoid the formation of sharp or acute angled edges on the porcelain toothbody, which might tend to be chipped off or be otherwise marred or fractured.

My invention further includes an artificial tooth comprising a tooth-body and a cusp structure, respectively having their opposed faces provided with interengaging means whereby they may be removably interlocked, when the tooth-body is rocked into operative position with respect to its cusp structure.

Specifically stated, the form of my invention as hereinafter described, comprehends a tooth-body having a root extension preferably terminating in an apex of conoidal formation, and a convexed occlusally disposed end face provided with an undercut recess directed forwardly in divergent relation to said face, and a cusp structure arranged to support said tooth-body, and having a similarly concaved inner face conforming to the convexed face of said tooth-body, and provided with means projecting therefrom, complementary to the undercut recess in said toothbody, and arranged to so interlock with said recess as to tend to maintain the convexed and concaved faces respectively of said toothbody and cusp structure wedgedly engaged.

My invention also includes all of the various novel features of construction and arrangement as hereinafter more definitely specified.

Figure 1:
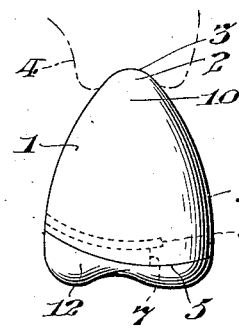
Figure 2:
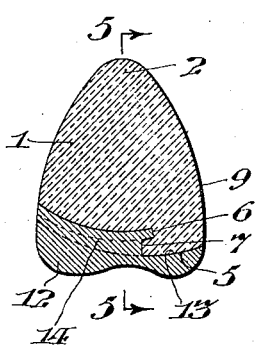
Figure 3:
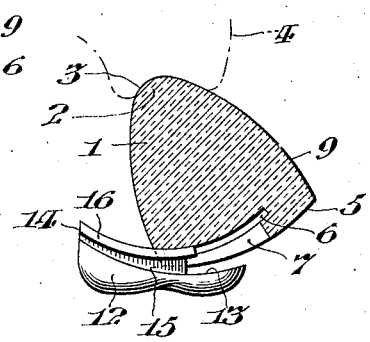
Figure 4:
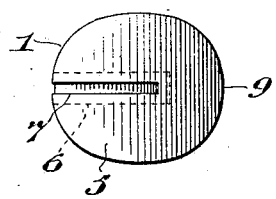
Figure 5:
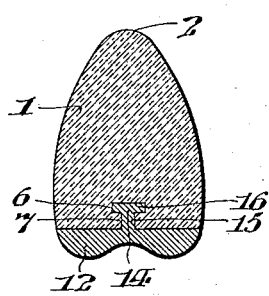
Figure 6:
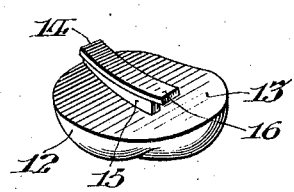
Figure 7:
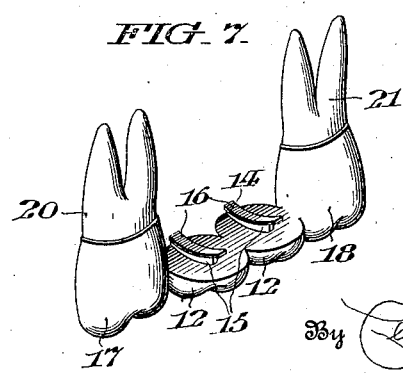

In the accompanying drawings, Figure 1 is a side elevational view of an artificial tooth constructed in accordance with my invention, and comprises a relatively separable toothbody and cup structure; Fig. 2 is a central longitudinal sectional view of the tooth structure shown in Fig. 1; Fig. 3 is a central vertical longitudinal sectional view of the tooth-body in the act of rocking into operative position on the cusp structure, which is shown in elevation for convenience of illustration; Fig. 4 is an inverted plan view of the tooth-body per se; Fig. 5 is a tranverse vertical sectional view of the tooth structure shown in Fig. 2, taken on the line 5—5 in said figure; Fig. 6 is a perspective view of the cusp structure per se; and Fig. 7 is a perspective view of a piece of bridgework embodying two of the cusp structures shown in Fig. 6 supported by relatively spaced caps carried on natural teeth, forming abutments for the bridge structure.

In said figures, the tooth-body 1 has the apical root extension 2 arranged to be extended into the root socket 3 of the gum ridge 4, which is shown in dot-and-dash lines in Figs 1 and 3. The tooth-body 1 has the occlusally disposed convexed face 5, which is provided with an undercut recess 6, opening through the slot 7 in said convexed occlusally disposed face 5.

As best shown in Fig. 3, the recess 6 is curved substantially in the direction of the curve of the occlusally disposed face 5, but is deflected slightly therefrom toward the outer face 9 of the tooth-body 1, the recess 6 being preferably curved about the center 10 of the apical root extension 2, while the occlusally disposed face 5 is curved about a greater radius than the radius of said recess.

The tooth-body 1 is arranged to be supported by the cusp structure 12 having its inner face 13 concaved to conform to the occlusally disposed cusp face 5 of said tooth-body 1. Said cusp structure is provided on the said concaved face 13, with an overhanging projection 14, complementary to the recess 6 and slot 7 in the tooth-body 1, and comprising the web 15 and flanged head 16, said web 15 being arranged to enter the slot 7 and the head 16 to enter the recess 6 in the tooth-body 1, so as to interlock therewith and rigidly engage the tooth-body 1 in wedgedly interlocked engagement with the cusp structure 12.

The cusp structure 12 may be supported in any suitable manner to afford a mounting for the tooth-body 1, such, for instance, as shown in Fig. 7, wherein two of the cusp structures 12 are disposed side by side between the caps 17 and 18, to which they are soldered to form an integral bridge structure, said caps 17 and 18 being carried by natural tooth root abutments 20 and 21 respectively.

It may be here noted that by reason of the fact that the recess 6 in the tooth-body 1 and the head 16 on the cusp structure 12 diverge outwardly from the occlusally disposed face 5 of the tooth-body 1, and the inner face 13 of the cusp structure 12, a wedging action is afforded between the tooth-body and cusp structure when they are united as shown in Figs. 1 and 2.

My invention is advantageous in that by forming the occlusally disposed surface of the tooth-body 1 convexed, and the inner surface of the cusp structure 12 correspondingly concaved, the apical root extension 2 may be first inserted into the extracted tooth socket and the tooth-body rocked into place about an axis so disposed that said apical root extension will rotate in said socket.

I do not desire to limit my invention to the precise details of construction and arrangement as herein set forth, as it is obvious that various modifications may be made therein without departing from the essential features of my invention as defined in the appended claims.

Having thus described my invention, I claim:

1. An artificial tooth comprising a tooth-body and a cusp structure, the tooth-body having a root extension and having a supporting face at its occlusally disposed end, convexedly curved about the region of said root extension as a center, and arranged to cooperate with a similarly concaved inner face on said structure.

2. An artificial tooth comprising a tooth-body having a root extension and a convexed occlusally disposed end face provided with an undercut recess directed forwardly, and a cusp structure having a similarly concaved inner face arranged to conform to said convexed surface and provided with means arranged to wedgedly interengage said undercut recess.

3. An artificial tooth comprising a tooth-body having a root extension and a convexed occlusally disposed face provided with a recess directed forwardly, and a cusp structure having a similarly concaved inner face arranged to conform to said convexed face, and provided with means arranged to wedgedly interengage said recess.

4. An artificial tooth comprising a tooth-body having a root extension and a convexed occlusally disposed end face provided with an undercut recess directed forwardly, and a cusp structure having a similarly concaved inner face arranged to conform to said convexed face, and provided with a projection having overhanging edges arranged to wedgedly interengage with said undercut recess.

5. An artificial tooth arranged to be engaged with a cusp structure provided with a concaved guide, and comprising a tooth-body provided with a root extension and having means cooperative with said guide to effect a rocking action of the tooth-body about the root extension as a center while being engaged with the cusp structure.

6. An artificial tooth arranged to be engaged with a cusp structure and comprising a tooth-body provided with a root extension and having convexedly curved means cooperative with said cusp structure to effect a rocking action of the tooth-body about the root extension as a center while being engaged with said cusp structure.

7. An artificial tooth arranged to be engaged with a cusp structure having its inner surface provided with a concaved guide, and comprising a tooth-body provided with a root extension and having its occlusally disposed end provided with convexedly curved means cooperative with said guide to effect a rocking action of the tooth-body about the root extension as a center, while being engaged with the cusp structure.

8. An artificial tooth comprising a tooth-body and a backing, a tooth-body having a root extension and a convexedly curved occlusally disposed portion, said backing having a complementary curved portion, said tooth-body and backing having opposed curved means constructed and arranged to guide the tooth-body and cause it to be rocked in a predetermined path into operative position with the backing while the root extension is substantially rotatably engaged in the gum socket and the backing is rigidly supported in spaced relation to said gum socket.

In witness whereof, I have hereunto set my hand this twenty-fifth day of March, A. D., 1926.

CLIFTON C. HALLOWELL.